May 12, 1925.  1,537,284

H. J. AYERS

DRAW OFF VALVE FOR ICE CREAM APPARATUS

Filed March 9, 1922

Inventor,
Hiram J. Ayers,
by Geyer Popp
Attorneys.

Patented May 12, 1925.

1,537,284

UNITED STATES PATENT OFFICE.

HIRAM J. AYERS, OF NEW YORK, N. Y.

DRAW-OFF VALVE FOR ICE-CREAM APPARATUS.

Application filed March 9, 1922. Serial No. 542,455.

*To all whom it may concern:*

Be it known that I, HIRAM J. AYERS, a citizen of the United States, residing at New York, in the county and State of New York, have invented new and useful Improvements in Draw-Off Valves for Ice-Cream Apparatus, of which the following is a specification.

This invention relates to a draw-off valve which is more particularly adapted for use in connection with the apparatus employed in the commercial manufacture of ice cream.

In practice, after the cream has been frozen in the customary freezers to a relatively soft consistency, it is discharged into a hopper from which depends a pipe for conveying the cream to the point where it is to be delivered into pans or other receptacles which are placed in a refrigerating room for hardening the cream. The draw-off valve forming the subject-matter of this application is located at the discharge end of this pipe and is adapted to regulate the flow of cream therefrom.

One of the objects of the invention is to provide a convenient controlling valve of this character which permits prompt delivery of the cream into the pans, so as not to allow it to run down or lose its temperature, and which avoids spilling or waste of the cream.

Another object is the provision of a sanitary draw-off valve which is free from packing and which can be readily taken apart for cleaning purposes.

Figure 1:
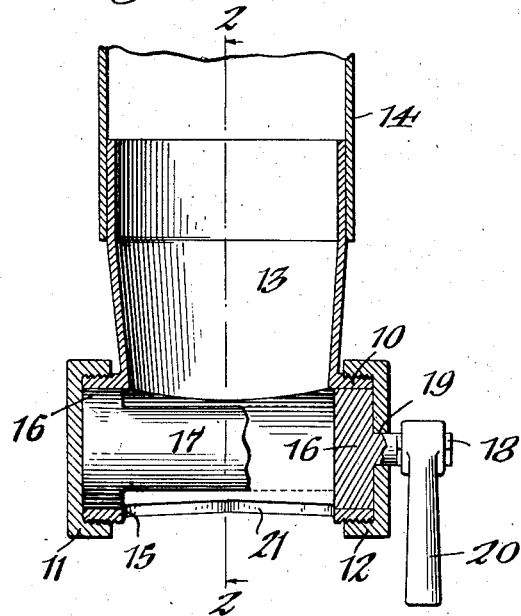
Figure 2:
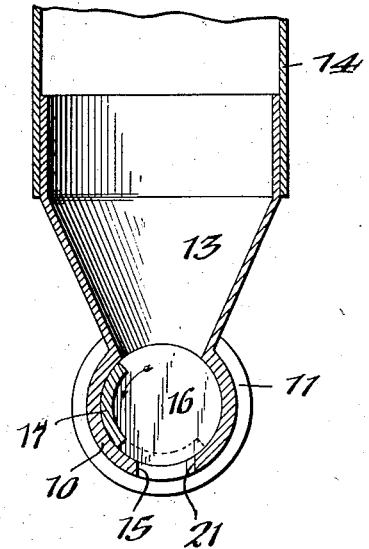
Figure 3:
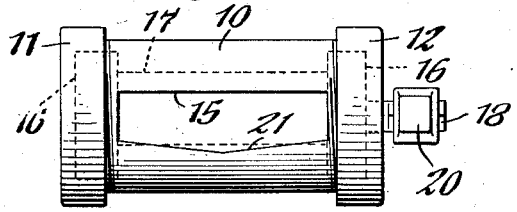
Figure 4:
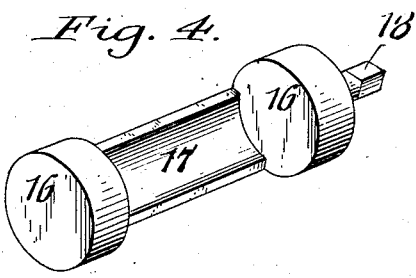
Figure 5:
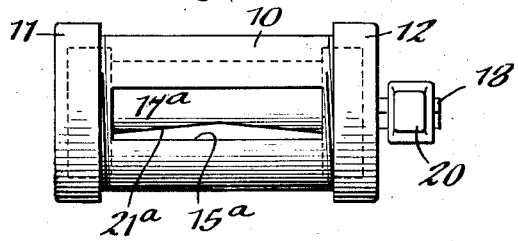
Figure 6:
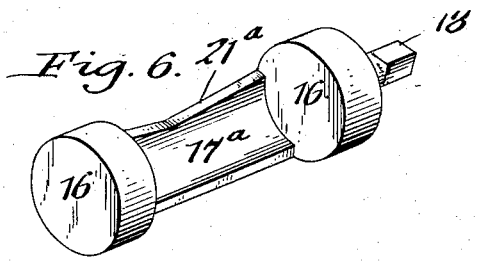

In the accompanying drawings: Figure 1 is a longitudinal section of one embodiment of the draw-off valve, showing the same applied to the outlet end of the hopper discharge-pipe. Figure 2 is a transverse section thereof on line 2—2, Fig. 1. Figure 3 is a bottom plan view of the valve. Figure 4 is a perspective view of the valve-plug. Figure 5 is a bottom plan view of a modified form of the improvement. Figure 6 is a perspective view of the valve-plug of said modification.

Similar characters of reference indicate corresponding parts throughout the several views.

Referring to Figs. 1–4, the improved valve comprises a cylindrical casing 10 closed at its ends, preferably by removable screw caps 11, 12. Extending from the upper side of this casing is a spout or connection 13 which communicates with the interior thereof and is adapted to fit into the lower end of the discharge pipe 14 which leads from the ice cream hopper, not shown, this hopper receiving the ice cream from the customary freezers. In its lower side the valve casing is provided with an outlet passage or opening 15, preferably rectangular in shape, which is located diametrically opposite the discharge spout 13 and of substantially the same dimensions as the lower end of the spout.

Rotatably mounted in the valve casing is a valve plug, which in its preferred form consists of end disks or heads 16 and a segmental portion or web 17 connecting said heads, the web being of the proper width circumferentially of the valve to close off the outlet passage 15 of the casing, as shown by dotted lines in Fig. 2. The remaining space between these heads from the port of the valve plug for establishing communication between the discharge end of the spout 13 and the outlet passage of the casing, when the valve is opened, is shown by full lines in Figs. 1 and 2.

One end of the valve plug is provided with a stem 18 which projects through a corresponding opening 19 in the adjacent cap 12 and which is provided with a handle 20 for turning the valve to its open and closed positions.

By means of the screw caps 11, 12, the valve plug may be readily adjusted in its casing to hold it against longitudinal movement therein.

One of the longitudinal edges of the outlet passage 15 of the valve-casing is preferably oblique to form a shearing cutting edge 21 for producing a clean, smooth cut in severing the protruding strip or ribbon of cream from the valve casing when the plug is turned from its open to its closed position. In its most desirable form, as shown in Figs. 3 and 4, this cutting edge is substantially V-shaped, so as to recede from both ends toward its center. By this construction, aside from the advantage of producing a smooth cut, the operator can regulate not only the thickness but also the width of the ribbon of cream emerging from the valve, according to the size of the receptacle into which it is to be delivered. If the ribbon is to be the full width of the outlet opening, the valve plug is fully opened, as shown by full lines in Figs. 1 and 2, while if the ribbon is to be narrower, the valve plug is closed more or less to a position in which its advancing edge overlaps the end portions of the V-shaped casing-edge 21, as shown by dotted lines in Fig. 3. This construction also prevents dripping or waste of the cream at the ends of the valve in closing the latter, the V-shaped edge tending to crowd the cream toward the center of the valve and insuring its discharge into the pans, thus avoiding soiling of the floor and rendering the operation of filling the pans absolutely sanitary.

The improvement affords the further important advantage that the emerging cream-ribbon is crowned on one side by the V-shaped edge, causing the top layer delivered into a pan to bulge above its side walls. The result is that when the usual cover is applied to the pan, the crowned top-layer is flattened out, completely filling the can from wall to wall, expelling the air therefrom and obtaining the best results. On the other hand, with a valve having a parallel-sided outlet, the discharged ribbon is flat on both sides, with the result that the cream in the middle of the pan tends to settle, and upon putting on the cover, the air in the depressed center is compressed, spreading the cream against the walls of the pan and imprisoning the air which is objectionable.

This valve is manifestly simple in construction, being composed of but few parts which can be easily dismembered for cleaning purposes, and as the valve is free from packing it is not liable to become fouled and contaminate the cream.

As a modification of the invention, the V-shaped cutting edge may be arranged on the valve plug instead of on the valve casing, as shown in Figs. 5 and 6. In these figures 17ª indicates the web of the plug provided at one of its longitudinal edges with the V-shaped cutting edges 21ª, which co-operates with the straight edge 15ª of the casing-outlet.

I claim as my invention:

1. A draw-off valve for viscous substances, comprising a casing having an inlet and an outlet at opposite sides thereof, and a valve-plug arranged in said casing and having a transverse port for connecting said outlet with said inlet, one of said elements having an approximately V-shaped edge at its outlet side which co-operates with an adjacent straight edge of the other element, said V-shaped edge being formed by two oblique faces extending continuously from the center of the element substantially to the ends thereof.

2. A draw-off valve for viscous substances, comprising a casing having an inlet and an outlet at opposite sides thereof, and a valve-plug arranged in said casing and having a transverse port for connecting said outlet with said inlet, one edge of the casing-outlet being V-shaped while the co-operating edge of the valve-plug is substantially straight, said V-shaped edge being formed by two oblique faces extending continuously from the center of the element substantially to the ends thereof.

HIRAM J. AYERS.